(12) United States Patent
Mather et al.

(10) Patent No.: US 12,329,165 B2
(45) Date of Patent: Jun. 17, 2025

(54) SYSTEM AND METHOD FOR BATTER MIXING AND APPLICATION

(71) Applicant: MATHER PROCESS SOULUTIONS INC., Bellevue, OH (US)

(72) Inventors: Scott Mather, Sandusky, OH (US); Don Mather, Sandusky, OH (US); Baron Mather, Sandusky, OH (US)

(73) Assignee: MATHER PROCESS SOULUTIONS INC., Bellevue, OH (US)

( * ) Notice: Subject to any disclaimer, the term of this patent is extended or adjusted under 35 U.S.C. 154(b) by 479 days.

(21) Appl. No.: 17/695,037

(22) Filed: Mar. 15, 2022

(65) Prior Publication Data

US 2022/0287315 A1    Sep. 15, 2022

Related U.S. Application Data

(60) Provisional application No. 63/161,025, filed on Mar. 15, 2021.

(51) Int. Cl.
*A21C 1/14*     (2006.01)
*A21C 1/00*     (2006.01)
(Continued)

(52) U.S. Cl.
CPC .............. *A21C 1/145* (2013.01); *A21C 1/003* (2013.01); *A21C 1/006* (2013.01); *A21C 1/02* (2013.01); *A21C 1/1405* (2013.01); *A21C 1/1425* (2013.01); *A21C 1/1435* (2013.01); *A21C 1/144* (2013.01); *A21C 1/149* (2013.01); *A23P 20/15* (2016.08)

(58) Field of Classification Search
CPC ......... A21C 1/006; A21C 1/149; A21C 1/144; A21C 1/1425; B01F 35/2117; B01F 35/2218
See application file for complete search history.

(56) References Cited

U.S. PATENT DOCUMENTS 4,525,071 A  *  6/1985  Horowitz ............ B01F 35/7176
                                                              700/226
6,007,236 A     12/1999  Maguire
(Continued)

FOREIGN PATENT DOCUMENTS

CN        210841353 U      6/2020
CN        112400935 A      2/2021
(Continued)

OTHER PUBLICATIONS

Written Opinion of the International Searching Authority dated Jun. 10, 2022.

*Primary Examiner* — Marc C Howell
(74) *Attorney, Agent, or Firm* — Jacob M. Ward; Ward Law Office LLC

(57) ABSTRACT

A batter mixing system has a mix tank. The mix tank includes a dry mix feed, a liquid feed, a mixer, and a mix tank load cell. A distribution tank is in communication with the mix tank via a transfer pump. The distribution tank includes a distribution tank load cell. The distribution tank is in further communication with a process line via a feed pump. A control system is in communication with each of the mix tank load cell and the distribution tank load cell. The control system is configured to operate each of the mix tank and the distribution tank.

15 Claims, 8 Drawing Sheets

(51) Int. Cl.
*A21C 1/02* (2006.01)
*A23P 20/15* (2016.01)

(56) References Cited

U.S. PATENT DOCUMENTS

| | | | |
|---|---|---|---|
| 6,056,822 | A * | 5/2000 | Jefferson ............ B01F 35/71775 |
| | | | 99/534 |
| 6,491,421 | B2 | 12/2002 | Rondeau et al. |
| 7,344,299 | B2 * | 3/2008 | Sprinkle ............... B01F 35/213 |
| | | | 366/152.5 |
| 10,286,371 | B2 | 5/2019 | Lehtonen et al. |
| 2005/0237852 | A1 | 10/2005 | Chandran |

FOREIGN PATENT DOCUMENTS

| | | |
|---|---|---|
| WO | 2006120660 A1 | 11/2006 |
| WO | 2017068071 A1 | 4/2017 |

* cited by examiner

SYSTEM AND METHOD FOR BATTER MIXING AND APPLICATION

CROSS-REFERENCE TO RELATED APPLICATIONS

This application claims the benefit of U.S. Provisional Application No. 63/161,025, filed on Mar. 15, 2021. The entire disclosure of the above application is incorporated herein by reference.

FIELD

The present disclosure relates to a mixing system and, more specifically, to a mixing system for batter.

BACKGROUND

This section provides background information related to the present disclosure which is not necessarily prior art.

In the food processing industry, various devices and processes have been developed for preparing coated food products. For example, in large-scale food processing environments, the food products may be battered and breaded using in-line processing equipment. The food products are introduced to a batter applicator machine and dipped or otherwise coated with a batter having a desired formulation and consistency. Thereafter, the food products may be breaded, fried, or otherwise processed as desired.

In certain batter mixing systems, wet and dry ingredients are mixed until a desired viscosity is reached. These mixing systems can constantly monitor the batter and make adjustments by adding wet or dry ingredients to maintain the target viscosity. By relying on viscosity, these systems do not measure particular amounts for each of the wet and dry ingredients, which results in varying ratios of ingredients in each batch. Accordingly, these systems can result in unpredictable weights for the final fried product, which can result in inconsistent product quality as well as excess production costs.

Additionally, certain batter mixing systems are configured to recirculate batter through multiple pumps. For example, certain batter mixing systems use three batter pumps that run an entirety of the line production time. The recirculation of batter can cause the batter in the mixing system to warm up due to pump friction. The increase in temperature can cause the batter to have a loose viscosity, which can result in the mixing system adjusting the viscosity of the batter. Certain systems utilize refrigerated, jacketed tanks on the mixing equipment in order to militate against temperature changes within the system.

There is a continuing need for a mixing system, which measures a predetermined ratio of wet and dry ingredients.

SUMMARY

In concordance with the instant disclosure, a mixing system which measures a predetermined ratio of wet and dry ingredients, has been surprisingly discovered.

A batter mixing system can include a mix tank, where the mix tank can have a dry mix feed, a liquid feed, a mixer, and a load cell. A distribution tank is in communication with the mix tank via a transfer pump. The distribution tank includes a load cell. The load cell can function as a level sensor such that level sensors are not required in the mix tank or the distribution tank. The distribution tank is in further communication with a process line via a feed pump. A control system is in communication with each of the load cells. The control system is configured to operate each of the mix tank and the distribution tank.

The mixing system can be used to mix a solid component and a liquid component to form a batter. In operation, a predetermined ratio of the solid component and the liquid component can be programmed into the mixing system. The mixing system can be equipped with one or more load cells. A load cell is understood herein to be a weighing device. The load cells can weigh predetermined amounts of solid and liquid ingredients, and thus, ensure the predetermined ratio of the solid component to the liquid component is mixed to specification rather than a predetermined viscosity.

The mixing system can be configured to be utilized in a system for manufacturing battered food products. The mixing system can prepare a batter based on a predetermined ratio of solid ingredients to liquid ingredients. As such, the mixing system can produce the same ratio of solids to liquids regardless of the viscosity of the resultant batter. The resultant batter is pumped in one direction from the mixing system to a batter bath device, which is configured to coat a food product in the batter. There is no recirculation of unused batter back to the mixing system. The mixing system can be configured to continually mix the predetermined ratio, as needed, for the batter bath device.

In certain embodiments, a batter mixing system includes a mix tank and a distribution tank. The mix tank includes a dry mix feed in communication with the mix tank. The dry mix feed is configured to provide a dry mix to the mix tank. A liquid feed in communication with the mix tank is configured to provide a liquid to the mix tank. The mix tank further includes a mixer and a mix tank load cell. The distribution tank includes a distribution tank load cell. The distribution tank is in fluid communication with the mix tank via a transfer pump and in fluid communication with a process line via a feed pump. A control system is in communication with the load cells. The control system is configured to operate each of the mix tank and the distribution tank.

In certain embodiments, the mix tank is freestanding on the mix tank load cell and the distribution tank is freestanding on the distribution tank load cell. Each of the mix tank and the distribution tank are surrounded by a frame saddle that permits vertical movement and prevents forward movement, backward movement, and lateral movement of the mix tank and the distribution tank. The mixer and the dry mix feed may be mounted to the frame to allow isolation of the mix tank and the distribution tank. In certain embodiments, the mixer includes an adjustable mounting for vortex mixing based on a batter recipe. In still certain embodiments, the distribution tank load cell is configured to send a signal to the control system to begin a first mix cycle when a zero weight of the distribution tank is measured.

The mix tank load cell is configured to measure a weight of a liquid and a weight of a dry mix within the mix tank and send a signal to the control system based on the weight of the liquid and the weight of the dry mix. A quantity of a dry mix feed and a quantity of a liquid may be added to the mix tank based on a weight measurement of the mix tank load cell independent of the viscosity of a mixture in the mix tank. The distribution tank load cell is configured to measure a weight of mixed batter within the distribution tank and send a signal to the control system based on the weight of the weight of the mixed batter. In certain embodiments, the control system includes a programmable logic controller including a user interface for programming a batter recipe. A quantity of a dry mix feed and a quantity of a liquid may be added to the mix tank based on a weight measurement of the mix tank load cell independent of the viscosity of the batter mixture in the mix tank. In certain embodiments, the transfer pump and the feed pump each comprise a unidirectional outflow pump.

In certain embodiments, a method of mixing batter comprises programming a batter recipe into a programmable logic controller of a batter mixing control system. Then, after measuring a zero weight at a mix tank, a first mix cycle may begin. The first mix cycle includes adding programmed amounts of a liquid and a dry mix to the mix tank. The programmed amounts of the liquid and the dry mix may be determined according to respective weights thereof and independent of the viscosity of a mixture in the mix tank. Then, the mixer may be operated for a preset time to create a mixed batter. At an expiration of the preset time, the mixed batter is transferred from the mix tank to a distribution tank. In certain embodiments, the mixed batter is transferred to the distribution tank until an operating weight is sensed at the distribution tank. Then, the mixed batter is transferred from the distribution tank to a process line.

In certain embodiments, the operating weight indicates an operating level of mixed batter in the distribution tank. In still certain embodiments, when the level of mixed batter falls to a level lower than the operating level, additional mixed batter is transferred from the mix tank to the distribution tank. When additional batter is needed, a next mix cycle may begin at the mix tank. The mixed batter may be transferred to the process line in one of a continuous flow and an intermittent flow. In certain embodiments, each of the mix tank and the distribution tank are configured for a unidirectional outflow. In still certain embodiments, an operation history of the batter mixing control system may be downloaded to ensure proper operation of the system. A batter coated food product may be prepared according to the method as described above.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 6A:
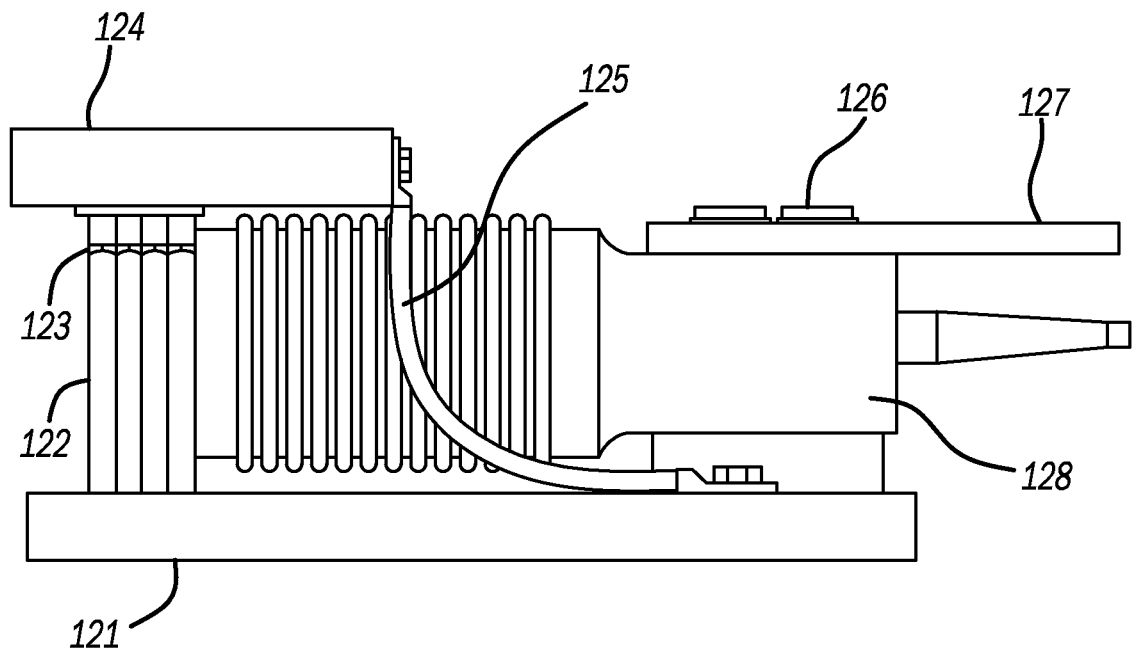
Figure 6B:
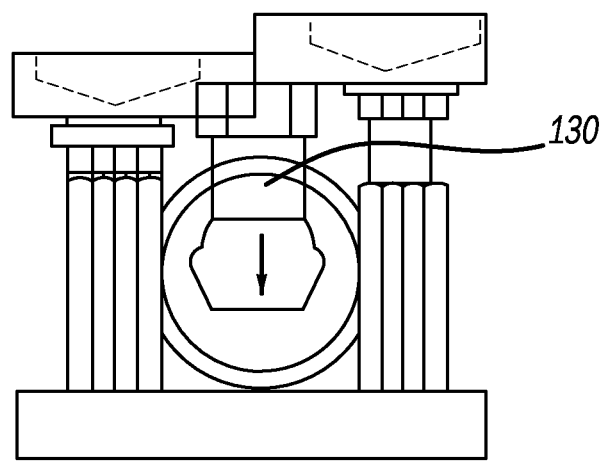
Figure 7A:
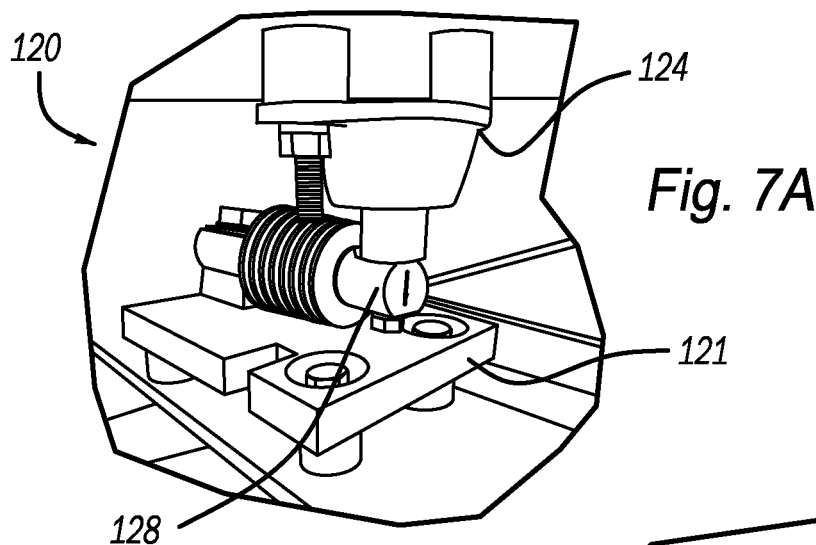
Figure 7B:
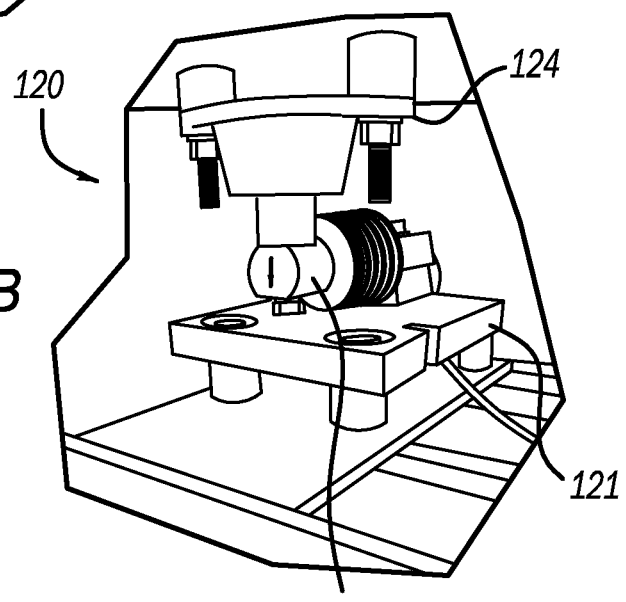
Figure 7C:
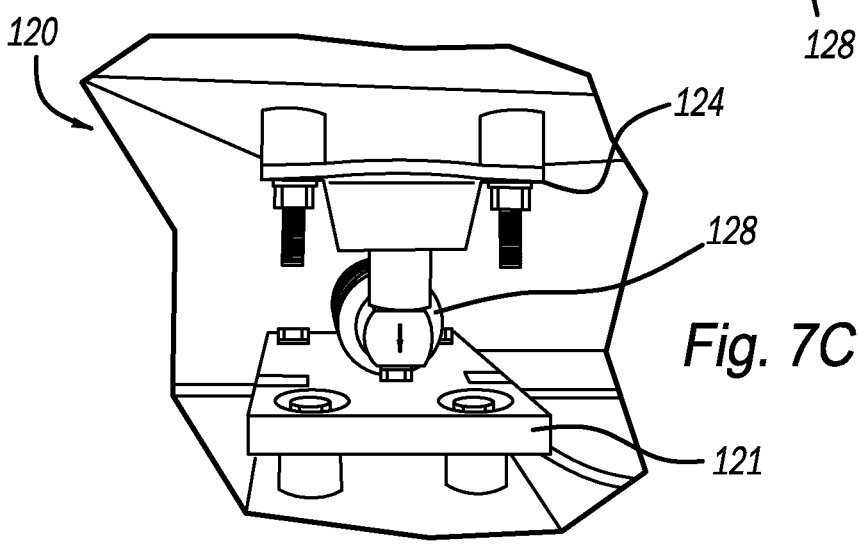
Figure 8:
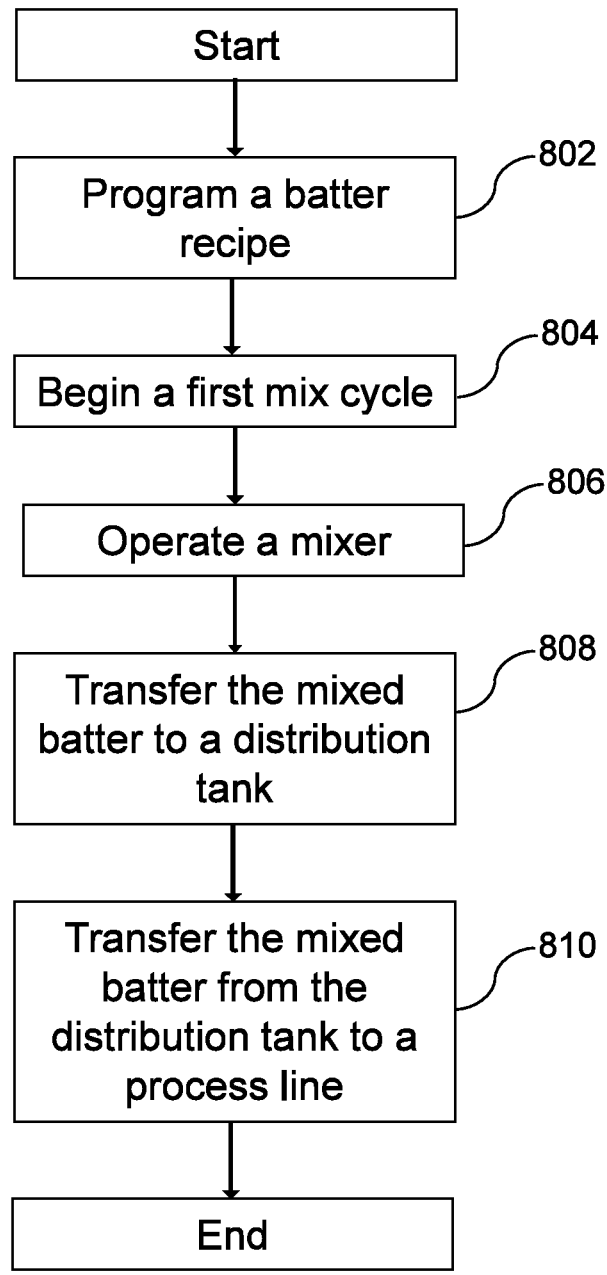

FIGS. 6A-6B each depict a side elevational view of a load cell used in an embodiment of the batter mixing system, in accordance with the present technology;

FIGS. 7A-7C each depict perspective views of a configuration of a load cell used in an embodiment of the batter mixing system, in accordance with the present technology; and FIG. 8 is a flowchart of a method of using a batter mixing system, in accordance with the present technology.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In concordance with the present technology, a batter mixing system has a mix tank. The mix tank includes a dry mix feed, a liquid feed, a mixer, and a load cell. A distribution tank is in communication with the mix tank via a transfer pump. The distribution tank includes a load cell. The load cell can function as a level sensor such that level sensors are not required in the mix tank or the distribution tank. The distribution tank is in further communication with a process line via a feed pump. A control system is in communication with each of the load cells. The control system is configured to operate each of the mix tank and the distribution tank. The liquid feed can be fluidly coupled to a liquid source, such as water.

The mixing system can be used to mix a solid component and a liquid component to form a batter. In operation, a predetermined ratio of the solid component and the liquid component can be programmed into the mixing system. The mixing system can be equipped with one or more load cells. A load cell is understood herein to be a weighing device. The load cells can weigh the predetermined amounts of solid and liquid ingredients, and thus, ensure the predetermined ratio of the solid component to the liquid component is mixed to specification rather than a predetermined viscosity.

The mixing system can be configured to be utilized in a system for manufacturing battered food products. The mixing system can prepare a batter based on a predetermined ratio of solid ingredients to liquid ingredients. As such, the mixing system can produce the same ratio of solids to liquids regardless of the viscosity of the resultant batter. The resultant batter is pumped in one direction from the mixing system to a batter bath device, which is configured to coat a food product in the batter. There is no recirculation of unused batter back to the mixing system. The mixing system can be configured to continually mix the predetermined ratio, as needed, for the batter bath device.

The mixing system can be configured to mix wet and dry ingredients to form a batter. It should be appreciated that the mixing system contemplated by the present disclosure can be utilized with a variety of batter and bread line configurations, and can be implemented by a skilled artisan, as desired.

The mixing system can contain a mix tank, a dry mix feed, and a liquid feed (e.g., water). The mixing tank can also have a mixer disposed therein. The mixer can be configured to stir the dry mix and the liquid to form the batter, in operation. The mixer can have an adjustable mounting to allow for vortex mixing based on the required batter application. The mixer can be frame mounted to allow isolation of other freestanding tanks of the mixing system. The mix tank can have a square shape, which is best suited for quick, substantially lump free mixing to maximize rotating vortexes. A skilled artisan can employ other suitable shapes for the mix tank, as desired.

The dry mix feed can be in communication with the mix tank and configured to provide a dry mix into the mix tank, in operation. The particular dry mix can be determined based on the required recipe. The dry mix feed can include a hopper. The dry mix feed can be frame mounted to allow isolation of other freestanding tanks of the mixing system. The dry mix feed can be configured to accept dry mix from a bulk in plant supply system. The dry mix feed can utilize an open mesh stainless steel wire belt to evenly sprinkle the dry mix into the mix tank. Advantageously, the steel wire belt can allow for fast, efficient, and substantially lump free batter.

The liquid feed can include a pump or solenoid valve. The liquid feed can be in communication with the mix tank and be configured to provide liquid (e.g., water) in the mix tank, in operation. The mixing system can include other liquid supply lines, as necessary. For example, the mixing system can include a beer line for beer battering applications. The liquid feed can be configured to maintain a predetermined temperature of the liquid, in operation.

The mixing system can include a distribution tank. The mix tank can be in communication with the distribution tank. The distribution tank can be configured to receive the batter from the mix tank, in operation. The use of the distribution tank allows the mixed batter to be pumped to a process line in a continuous flow or an intermittent flow depending on the batter application process requirements. It should be appreciated that the distribution tank can be disposed between the mixing tank and the process line. In certain embodiments, the distribution tank can be disposed adjacent to the mix tank. In other embodiments, the distribution tank can be disposed adjacent to a batter applicator of the process line.

In particular, a transfer pump can pump the batter from the mix tank to the distribution tank. Advantageously, the transfer pump can be variable speed and can keep the distribution tank at an optimum level depending on the line requirements. The distribution tank can further include a feed pump that is configured to pump batter from the distribution tank to the process line, as needed, in operation.

It should be appreciated that there can be embodiments of the present disclosure, which contain one transfer pump. The use of one transfer pump can ensure that all mixed batter transferred to a processing line will be "fresh" and have a predetermined ratio of liquid to solids, where the mixed batter is not recirculated or contaminated with coatings or food product particles. The two tank system of the present disclosure can allow for a selected hydration time, being a time required to thoroughly wet the batter, to take place. This allows for more control of the process line compared to other systems.

Each of the mix tank and the distribution tank can be separately mounted from the other components of the mixing system. The mix tank and distribution tanks can be freestanding on a weight measuring means such as a load cell. The use of the weight measuring means (e.g., load cells) can eliminate the need for a viscosity measuring system. The weight measuring means can be configured to measure a weight of the mix tank and the distribution tank.

Where the weight measuring means is configured as a load cell, for example, the load cell of the mix tank can measure a weight of the dry mix and a weight of the liquid as determined by the particular recipe. The load cell can therefore be used to mix a precise ratio of dry mix and liquid that can be duplicated hour to hour and day to day. By using load cells, the operation history can be downloaded to verify daily operations.

The mixing system can include a control system. The control system can be in communication with the dry mix feed, the liquid feed, the transfer pump, the feed pump, and the load cells. The control system can include a programmable logic controller (PLC). The PLC can have a user interface. The user interface can be used, in operation, to program the recipe, as required. The user interface can include an input means, such as a touchscreen or buttons, as needed.

The use of load cells on the distribution tank can allow communication between the distribution tank and the PLC to indicate when the mix tank should start the next mixing cycle, and to automatically transfer the mixed batter to the distribution tank once the mix cycle is complete.

The batter mixer can include load cells disposed under the mix tank and the distribution tank to monitor the amount of batter therein. The load cells can be configured to send a signal to the PLC when a predetermined level is reached. The PLC can then send a signal to the dry mix feed and the liquid feed to mix more batter, or send a signal to the transfer pump to send batter to the distribution tank, as needed. The control system can allow the mixing system to mix batter and supply the batter to the processing line in an autonomous and continuous manner. The batter applicator on the processing line can have a level sensor that can call for mixed batter as needed from the distribution tank. It should be appreciated that the mix tank and the distribution tank can be operated without the use of level sensors. The load cells can be used to determine both the weighed ratios of the wet and dry ingredients, and also monitor the weight of the batter with each of the tanks.

In operation, the batter recipe can be programmed into the PLC. The recipe can include the exact amounts of dry mix and liquid required for the batter. The PLC can send a signal to the liquid feed. When the load cell of the mix tank measures the predetermined level of liquid, the PLC can start the mixer. Then, the dry feed can start adding dry ingredients to the liquid until the load cell determines the correct amount of dry mix has been added. The mixer can then run for a predetermined amount of time. The PLC can then signal to the transfer pump to transport the batter to the distribution tank. The PLC can signal to the feed pump to transfer the batter from the distribution tank, as needed. The PLC can monitor the level in the distribution tank to determine when more batter is needed. The PLC can signal the mix tank to start the mix process again.

It should be appreciated that the mixing system of the present disclosure can utilize the load cells and the control system to mix batter continuously and autonomously as needed. The batter can be precisely measured and mixed using the load cells. The mixing system only pumps batter in one direction, which can ensure the batter is fresh and free of any food particles, as the prepared batter is not recirculated. Additionally, the mixing system does not utilize pumps that run for a duration of the mix cycle. The mixing system can have one pump that can run during the mix cycle (e.g., about 2 to 3 min. per batch of batter) and one transfer pump that can run (e.g., about 15 sec.) to feed the process line batter applicator.

It should be further appreciated that the load cells of the present disclosure can be used to monitor the weights of the contents within both the mix tank and the distribution tank. Accordingly, the mix tank and the distribution tank do not require level sensors. The load cells can be used to monitor both the weight of ingredients, and the weight of the batter. The load cells can indicate the PLC when the weight of the batter in the mix tank falls below a predetermined value, for example.

Advantageously, the mixing system of the present disclosure may use computer controlled load cell technology to calculate and dispense a precise amount of liquid and dry mix by ratio and weight. In particular, the present technology utilizes one or more load cells which eliminates the need for viscosity controls and measurements. The present technology also eliminates recirculation of batter that may be contaminated by or otherwise mixed with predust and food particles. Moreover, the present technology eliminates the need for a heat generating recirculation pump and piping and does not require cleaning a viscosity filter.

The mixing system as described herein utilizes continuous batch mixing to exact ratios and weight and which has distribution tank that allows for a continuous on demand batter flow to the one or more applicators. In particular, because the system utilizes a control system with one or more load cells, it is able to produce the precise amount of batter as called for by a particular recipe. The system includes a programmable logic controller including a user interface for programming a batter recipe with an easy to read and understand controller. It should also be appreciated that the system transfers mixed batter from the mix tank to a distribution tank and to a process line applicator in one direction, which does not recirculate contaminated or adulterated batter. This means that each and every batch of batter may be precisely mixed according to a weight and ratio of liquid to dry mix in a repeatable manner. In particular, by measuring by weight, the consistency of the batter may be replicated such that the breading and pickup of the process line is consistent and repeatable. In certain embodiments, the system may produce up to 2500 lbs. of batter in an hour. In still certain embodiments, the system according to the present technology uses minimal pump operation and horsepower with a simple liquid addition by weight. As such, the batter mixing system as described herein has many advantages.

Examples

Example embodiments of the present technology are provided with reference to the several figures enclosed herewith.

As shown in FIGS. 1-4, a batter mixing system 100 is provided. The batter mixing system 100 includes a distribution tank 101, a mix tank 102, and a control system 107 in communication with the mix tank 102 and the distribution tank 101. In particular, the control system 107 is configured to operate each of the mix tank 102 and the distribution tank. The distribution tank 101 and the mix tank 102 are supported by one or more load cells 120. The mix tank 102 includes a dry mix feed 108 or hopper and one or more liquid lines 112 and 113 in communication with the mix tank 102. In certain embodiments, the one or more liquid lines 112 and 113 are configured to supply liquid (e.g., water) to the mix tank 102 and the dry feed mix. The liquid supplied to the mix tank may range between 38° and 40° Fahrenheit. In certain embodiments, the mix tank 102 and the distribution tank 101 are configured to hold approximately 1 gallon or 9 lbs. of liquid. In still certain embodiments, the one or more liquid lines 112 and 113 are configured to supply beer or other appropriately desired liquid to the mix tank 102. The dry mix feed 108 is configured to dispense an amount of dry mix to the mix tank 102. In certain embodiments, the dry mix feed 108 is configured to dispense a programmed amount of mix feed to the mix tank 102 as determined by a batter recipe programmed at the control system 107. The distribution tank 101 is in fluid communication with the mix tank 102 through a transfer pump 104 and a liquid line 113. The distribution tank 101 is in fluid communication with a process line through a feed pump 105.

The mix tank 102 and the distribution tank 101 are each disposed atop a load cell 120. In particular, the mix tank 102 is disposed atop a mix tank load cell and the distribution tank is disposed atop a distribution tank load cell. The load cell 120 is configured to measure a weight of the mix tank 102 and a weight of the distribution tank 101. The load cell 120 may weigh a predetermined amount of solid and liquid within the mix tank 102 to ensure a proper ratio of a solid and a liquid for a batter recipe. In certain embodiments, the load cell 120 may function as a level sensor such that level sensors are not required in the mix tank 102 or the distribution tank 101. For example, in some embodiments, the load cell 120 may indicate that an amount of mixed batter in the distribution tank 101 has fallen below an operating level 115 to a low level 116 where the load cell 120 is configured to send a signal to the control system 107 to transfer mixed batter from the mix tank 102 to the distribution tank 101.

In certain embodiments, the mix tank 102 and the distribution tank 101 are each free-standing on a respective load cell 120. A saddle 111 of a frame 110 of the batter mixing system 100 is configured to surround each of the mix tank 102 and the distribution tank 101, such that the saddle prevents the mix tank 102 and the distribution tank 101 from moving in a forward direction, a backward direction and laterally, while permitting the mix tank 102 and the distribution tank 101 to move in a vertical direction on a load cell 120. In particular, the saddle 111 prevents the mix tank 102 and the distribution tank 101 from being jostled or bumped and inadvertently moved on the load cell 120. The saddle 111 prevents the mix tank 102 and the distribution tank 101 from moving so that an accurate weight reading of the mix tank 102 and the distribution tank 101 is always taken. In certain embodiments, each of the mix tank 102 and the distribution tank 101 sit atop a plurality of load cells 120, so that if one load cell 120 fails, an accurate weight reading is still measured.

As shown in FIGS. 1-4, in certain embodiments, the mixer 103 and the dry mix feed 108 are directly mounted to the frame 110 so that the mix tank 102 and the distribution tank 101 are each isolated on a load cell 120. In still certain embodiments, the mixer 103 includes an adjustable vortex for variable mixing based on the batter recipe. The load cell 120 is configured to measure a weight of a liquid and a weight of a dry mix within the mix tank 102. The load cell 120 may send a signal to the control system 107 based on the weight of the liquid and the weight of the dry mix, which may cause the batter mixing system 100 to add more liquid or dry mix. In certain embodiments, a load cell 120 measuring a weight of zero at the distribution tank 101 signals the batter mixing system 100 to begin to add a liquid and dry mix to the mix tank 102. In still certain embodiments, a quantity of dry mix and a quantity of liquid may be added to the mix tank 102 until the mixture reaches a full level within the mix tank 102 as determined according to a weight measurement of a load cell 120. In particular, the load cell 120 enables a precise quantity of a dry mix and a precise quantity of a liquid to be added to achieve a ratio for a recipe independent of the viscosity of the mixed batter.

In certain embodiments, the control system 107 includes a programmable logic control including a user interface for programming a batter recipe into the batter mixing system 100. In still certain embodiments, the control system 107 may include a touch screen control or other appropriately desired user interface for programming a batter recipe. An operation history may be downloaded through the control system 107 to monitor daily operations and a mixing schedule of the batter mixing system 100. The transfer pump 104 and the feed pump 105 may each be configured as a unidirectional outflow pump so there is no recirculation of batter within the batter mixing system 100.

Figure 1:
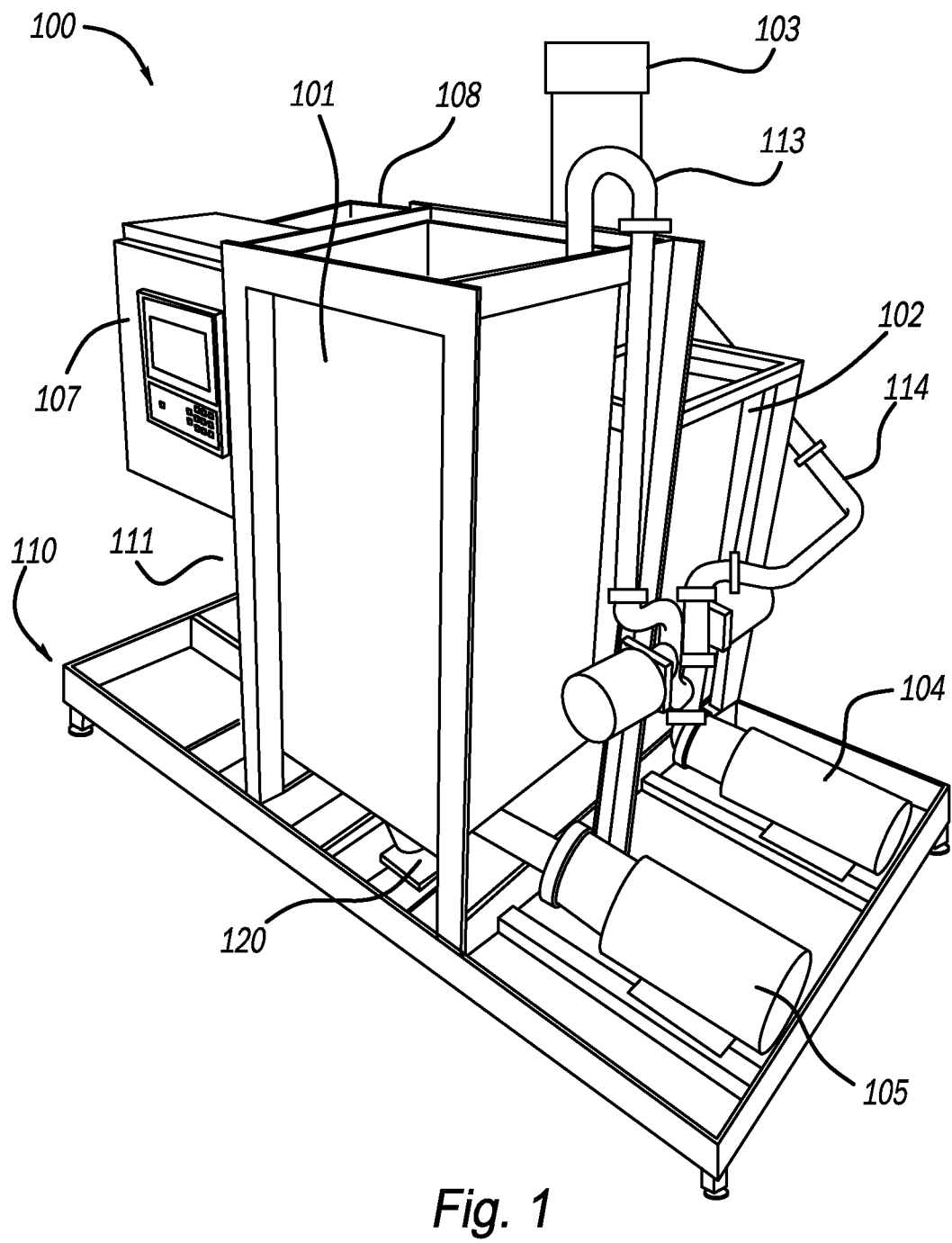
FIG. 1 is a top right perspective view of an embodiment of a batter mixing system, in accordance with the present technology.
Figure 2:
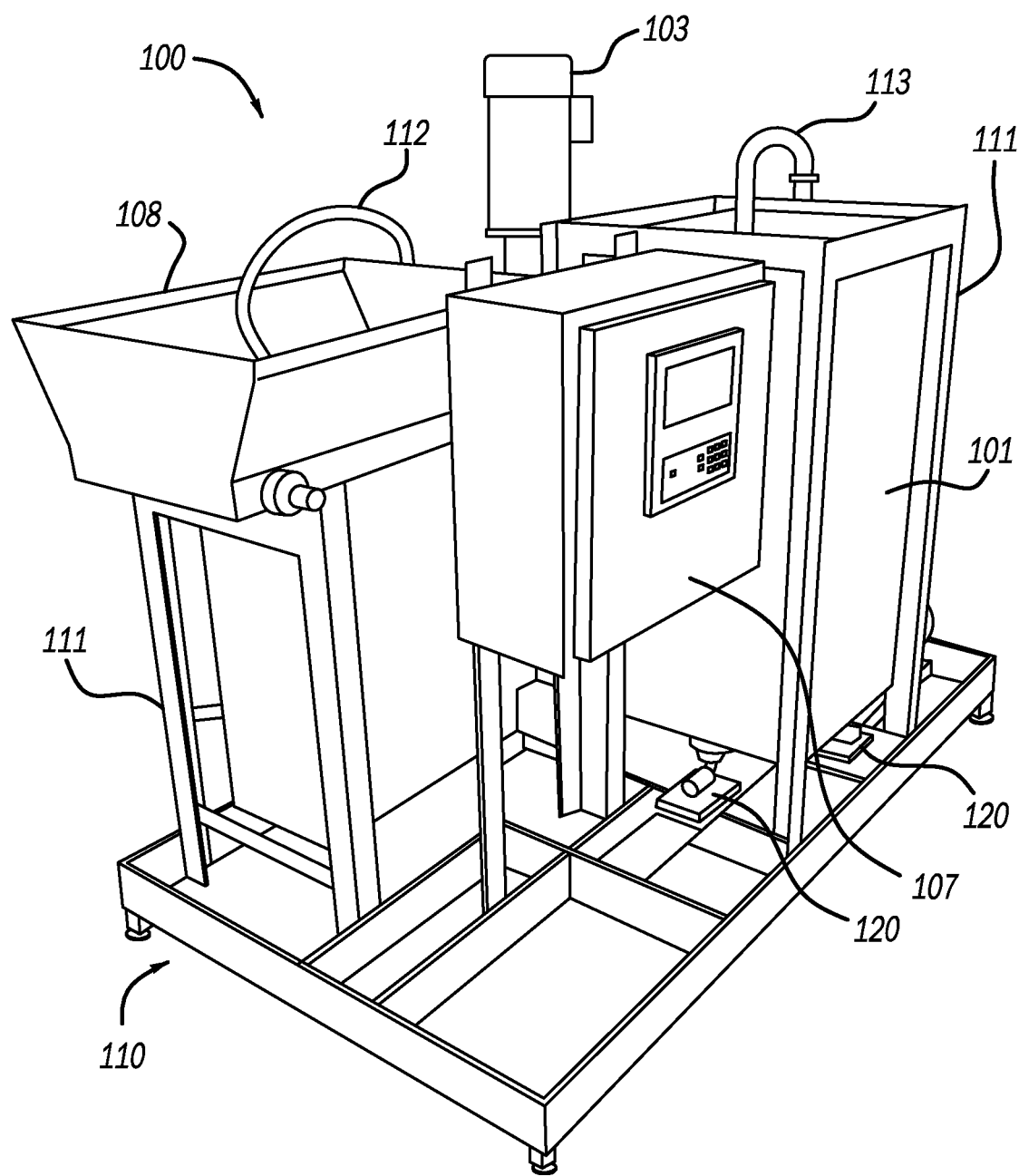
FIG. 2 is a top left perspective view of the embodiment of the batter mixing system, in accordance with the present technology.
Figure 3:
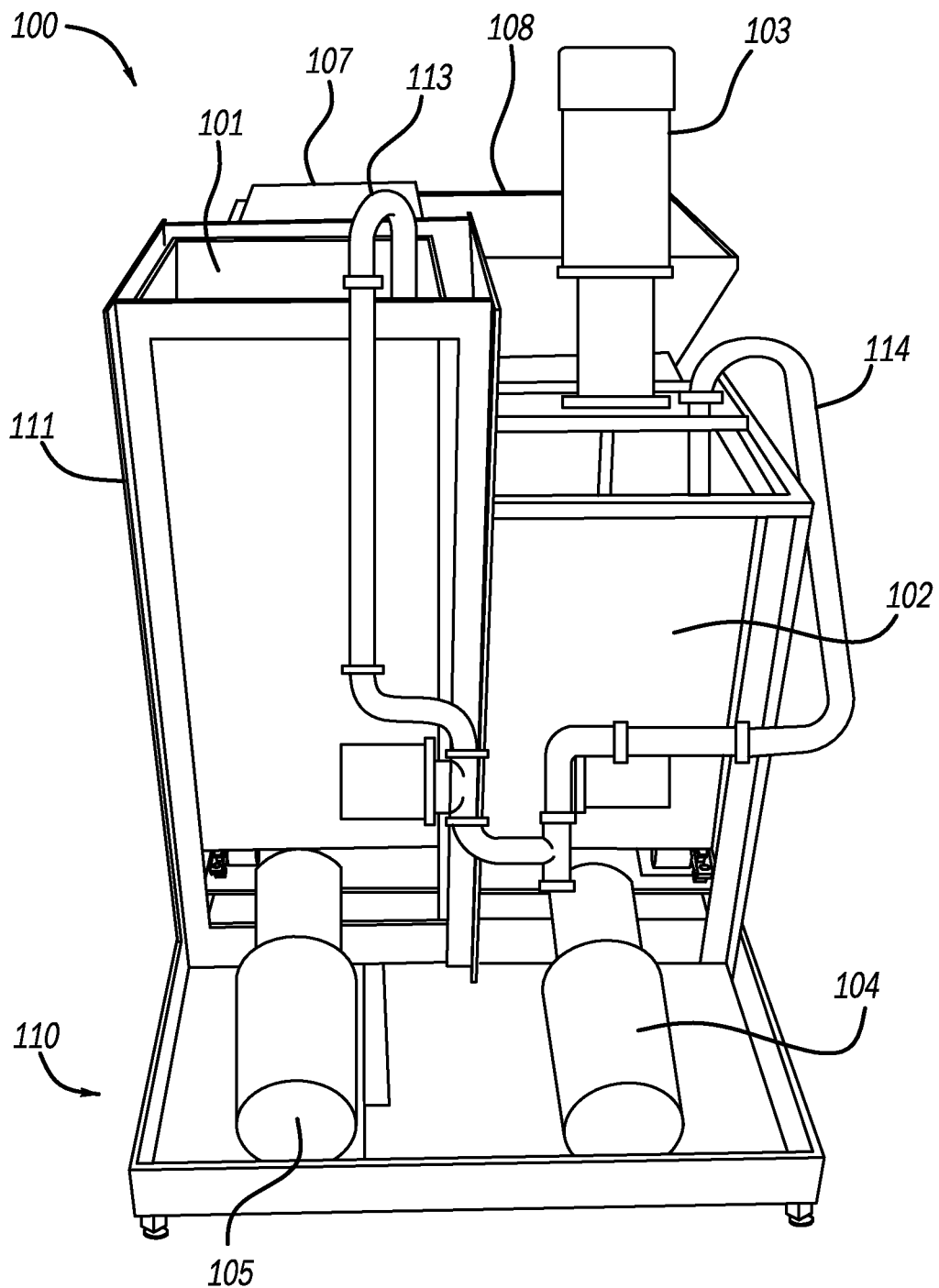
FIG. 3 is a top right-side perspective view of the embodiment of the batter mixing system, in accordance with the present technology.
Figure 4:
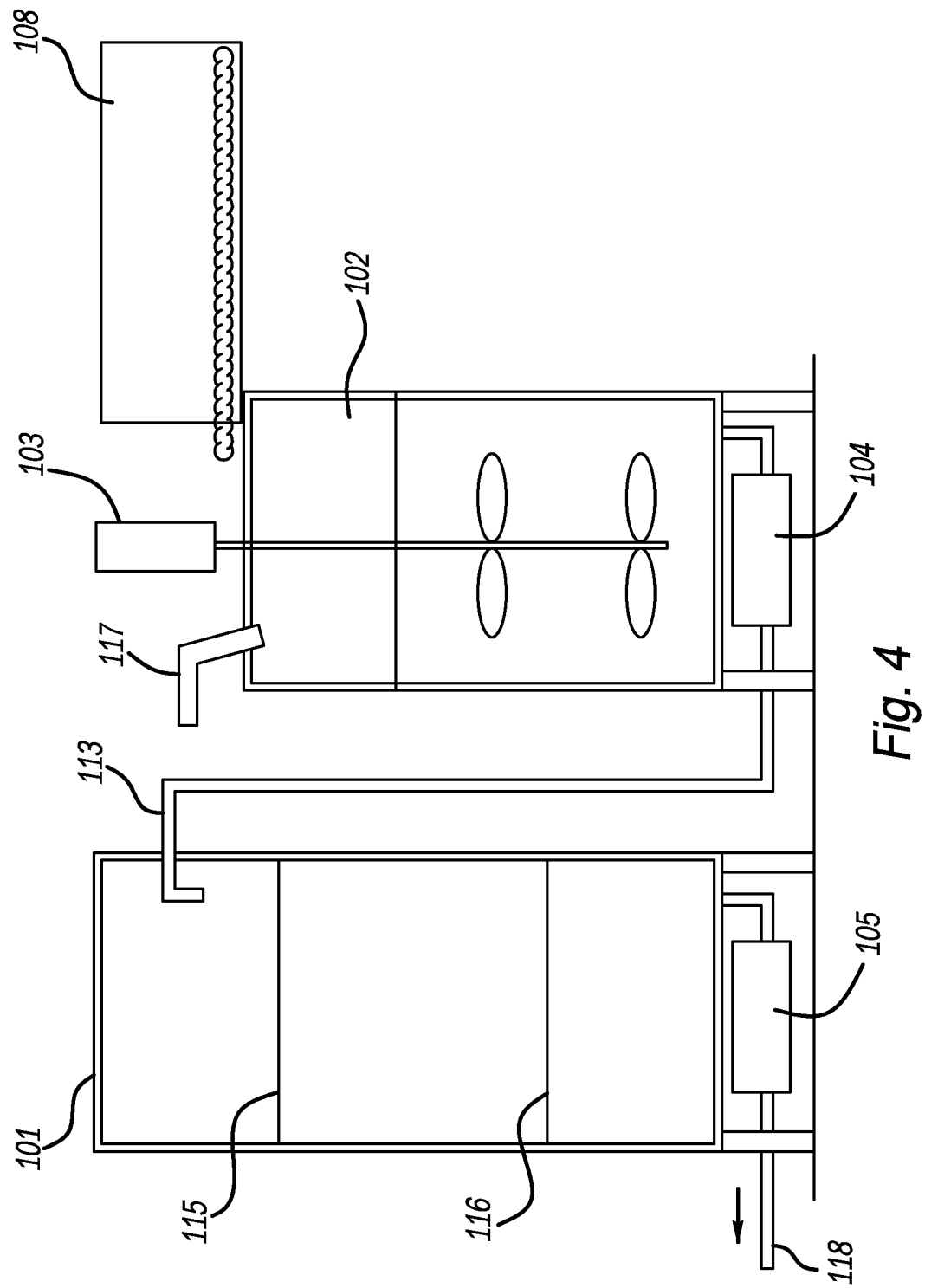
FIG. 4 is a schematic cross-section view of the embodiment of the batter mixing system, in accordance with the present technology.
Figure 5:
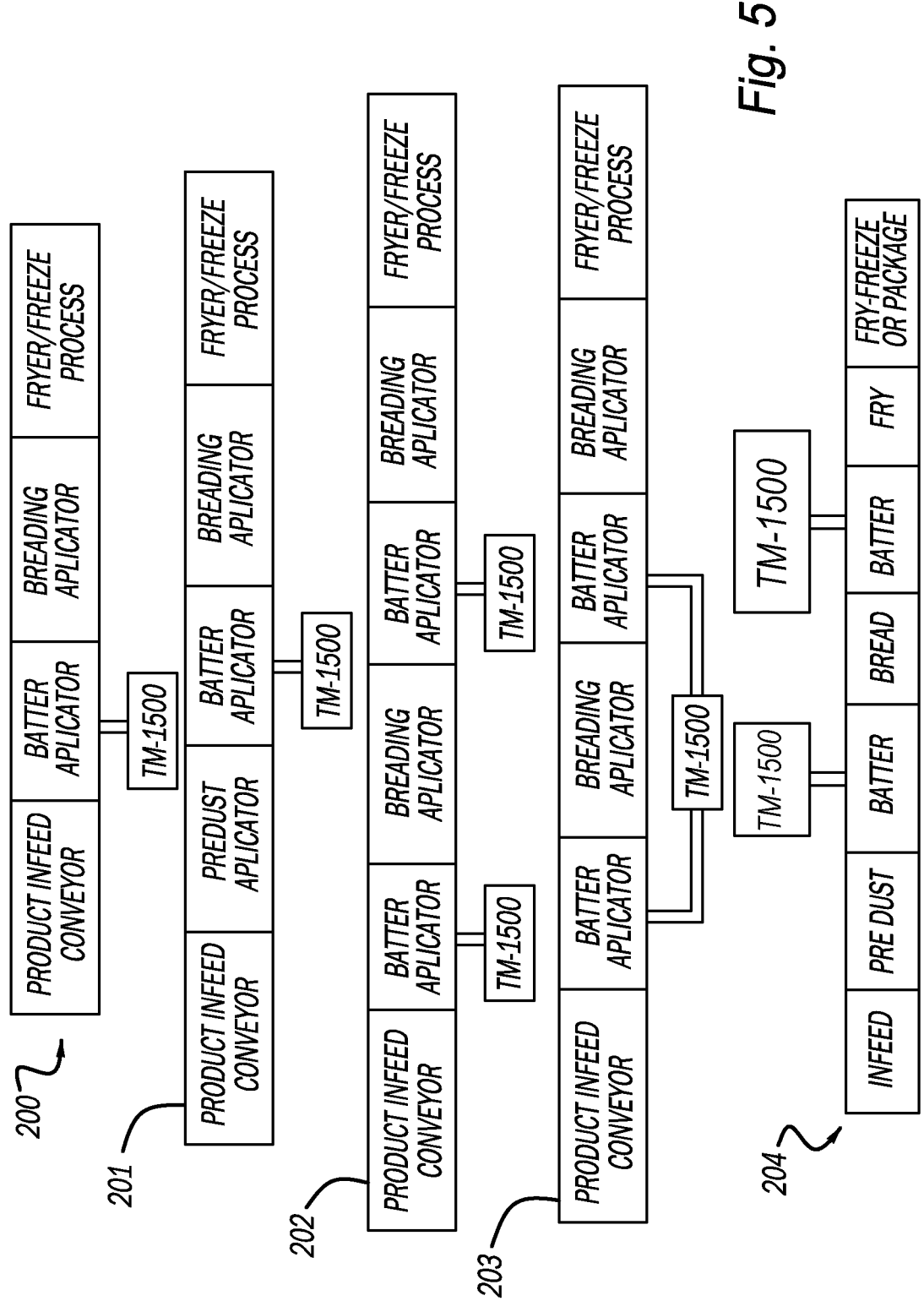
FIG. 5 depicts schematic views of example processing lines utilizing the batter mixing system, in accordance with the present technology.

FIG. 5 shows an example view of a process line utilizing the batter mixing system 100. The process line 200, 201, 202, 203, and 204 is in fluid communication with the distribution tank 101 through the feed pump 105. The feed pump 105 comprises a unidirectional outflow pump that is configured to feed the process line 200, 201, 202, 203, and 204 with mixed batter. In particular, the process line 200, 201, 202, 203, and 204 may be configured in any appropriately desired orientation and/or order for applying mixed batter to a food product.

FIGS. 6A-6B and 7A-7C show configurations of a load cell 120 in accordance with certain embodiments. The load cell 120 may include a base plate 121, a jacking spacer 122, one or more jacking nuts 123, a top plate 124, a ground strap 125, one or more load cell bolts 126, a cable guard plate 127 a load cell body 128 a load cell spacer 129 and a load button 130. The load cell 120 is configured to measure a weight of one or both of the mix tank 102 and the distribution tank 101. The load cell 120 is in communication with the control system 107 and is configured to send a signal to the control system 107 based on a weight of one or both of the mix tank 102 and the distribution tank. For example, the load cell 120 may send a signal to the control system 107 to begin a mix cycle within the mix tank 102 or transfer mixed batter from the distribution tank 101 to a process line.

FIG. 8 shows a method of mixing batter using the batter mixing system 100, such as described above. In step, 802 a batter recipe is programmed into a programmable logic controller of a control system 107 for a batter mixing system. In step 804, after a weight of zero indicating no liquid and no solid within a mix tank is measured, a first mix cycle begins. Beginning the first mix cycle may include adding a programmed amount of a liquid and a dry mix to the mix tank 102. The amount of a liquid and the amount of a dry mix that is added to the mix tank 102 is determined by a weight independent of a viscosity of a mixture in the mix tank 102. The programmed amount of dry ingredients or dry mix may be added to the mix tank 102 after the programmed amount of liquid is added to the mix tank 102. Then, in step 806 a mixer is operated to for a preset time to mix the solid and the liquid within the mix tank 102. In certain embodiments, the mixer may be operated for a preset time of two to three minutes. However, the mixer may be operated for any appropriately desired time to mix the solid and the liquid. In step 808, the mixed batter is transferred to a distribution tank 101. In certain embodiments, the mixed batter may be transferred to the distribution tank 101 until an operating level of mixed batter within the distribution tank 101 is achieved. The operating level of mixed batter within the distribution tank 101 may be measured by weight by a load cell 120 of the distribution tank 101. Then, in step 810, the mixed batter is transferred from the distribution tank to a process line.

In certain embodiments, if a level of mixed batter within the distribution tank 101 falls below the operating level, additional mixed batter is transferred from the mix tank 102 to the distribution tank 101. When the mixed batter within the mix tank 102 falls below a full level, a next mix cycle may begin within the mix tank 102. In particular, one or more additional or next mix cycles may be created at the mix tank 102 and transferred to the distribution tank 101 until a required amount of mixed batter is made according to a recipe. The mixed batter may be transferred to the process line in one of a continuous flow and an intermittent flow. In certain embodiments, the mix tank 102 and the distribution tank 101 comprises a unidirectional outflow. This ensures that there is no mixing and/or re-mixing of the liquid and dry mix. In still certain embodiments, an operation history for the batter mixing system 100 may be downloaded to verify a daily operation of the batter mixing system 100.

In certain embodiments, a method of coating a food product may include coating the food product with a mixed batter prepared according to the method above.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:

1. A batter mixing system, comprising:
    a mix tank including:
        a dry mix feed in communication with the mix tank, where the dry mix feed is configured to provide a dry mix to the mix tank;
        a liquid feed in communication with the mix tank, where the liquid feed is configured to provide a liquid to the mix tank;
        a mixer; and
        a mix tank load cell;
    a distribution tank including a distribution tank load cell, the distribution tank in fluid communication with the mix tank via a transfer pump and in fluid communication with a process line via a feed pump; and
    a control system in communication with the mix tank load cell and the distribution tank load cell, the control system configured to operate the dry mix feed and the liquid feed,
    wherein:
        the mix tank is freestanding on the mix tank load cell and the distribution tank is freestanding on the distribution tank load cell,
        each of the mix tank and the distribution tank are surrounded by a frame saddle that permits vertical movement and prevents forward movement, backward movement, and lateral movement of the mix tank and the distribution tank,
        the mixer and the dry mix feed are mounted to a frame to allow isolation of the mix tank and the distribution tank, and
        the mixer includes an adjustable mounting for vortex mixing based on a batter recipe.

2. The batter mixing system of claim 1, wherein the distribution tank load cell is configured to send a signal to the control system to begin a first mix cycle when a zero weight of the distribution tank is measured.

3. The batter mixing system of claim 1, wherein the mix tank load cell is configured to measure a weight of the liquid and a weight of the dry mix within the mix tank and send a signal to the control system based on the weight of the liquid and the weight of dry mix.

4. The batter mixing system of claim 3, wherein the control system is configured to operate the dry mix feed to provide a quantity of the dry mix feed to the mix tank and the control system is configured to operate the liquid feed to provide a quantity of the liquid to the mix tank based on a weight measurement of the mix tank load cell independent of a viscosity of a mixture in the mix tank.

5. The batter mixing system of claim 1, wherein the distribution tank load cell is configured to measure a weight of mixed batter within the distribution tank and send a signal to the control system based on the weight of the weight of the mixed batter.

6. The batter mixing system of claim 1, wherein the control system includes a programmable logic controller including a user interface for programming a batter recipe.

7. The batter mixing system of claim 1, wherein the control system is configured to operate the dry mix feed to provide a quantity of the dry mix to the mix tank and the control system is configured to operate the liquid feed to provide a quantity of the liquid to the mix tank based on a weight measurement of the distribution tank load cell independent of the viscosity of the batter mixture in the mix tank.

8. The batter mixing system of claim 1, wherein the transfer pump and the feed pump each comprise a unidirectional outflow pump.

9. A method of mixing batter comprising:
providing a batter mixing system, comprising:
  a mix tank including:
    a dry mix feed in communication with the mix tank, where the dry mix feed is configured to provide a dry mix to the mix tank;
    a liquid feed in communication with the mix tank, where the liquid feed is configured to provide a liquid to the mix tank;
    a mixer; and
    a mix tank load cell;
  a distribution tank including a distribution tank load cell, the distribution tank in fluid communication with the mix tank via a transfer pump and in fluid communication with a process line via a feed pump; and
  a control system in communication with the mix tank load cell and the distribution tank load cell, the control system configured to operate the dry mix feed and the liquid feed;
programming a batter recipe into a programmable logic controller of the batter mixing control system;
after measuring a zero weight at the mix tank, beginning a first mix cycle including adding programmed amounts of a liquid and a dry mix to the mix tank, where the programmed amounts of the liquid and the dry mix are determined according to weight independent of a viscosity of a mixture in the mix tank;
operating the mixer for a preset time to create a mixed batter;
at an expiration of the preset time, transferring the mixed batter from the mix tank to the distribution tank, wherein the mixed batter is transferred to the distribution tank until an operating weight is sensed at the distribution tank;
transferring the mixed batter from the distribution tank to a process line; and
downloading an operation history of the batter mixing control system.

10. The method of claim 9, wherein the operating weight indicates an operating level of mixed batter in the distribution tank.

11. The method of claim 10, wherein when the level of mixed batter falls to a level lower than the operating level, additional mixed batter is transferred from the mix tank to the distribution tank.

12. The method of claim 9, further comprising beginning a next mix cycle at the mix tank.

13. The method of claim 9, further comprising transferring the mixed batter to the process line in one of a continuous flow and an intermittent flow.

14. The method of claim 9, wherein each of the mix tank and the distribution tank is configured for a unidirectional outflow.

15. A method of coating a food product, comprising:
coating the food product with a mixed batter prepared according to the method of claim 9.

* * * * *